United States Patent
Curran et al.

(10) Patent No.: US 9,208,509 B1
(45) Date of Patent: Dec. 8, 2015

(54) SYSTEM, METHOD, AND COMPUTER PROGRAM FOR PERSONALIZING CONTENT FOR A USER BASED ON A SIZE OF A WORKING VOCABULARY OF THE USER

(75) Inventors: David Curran, Tyrrelstown (IE); Juraj Sofranko, Kezmarok (SK); Keith Bradley, Sandyford (IE); Michael Kerrigan, Rathfarnham (IE)

(73) Assignee: Amdocs Software Systems Limited, Dublin (IE)

( * ) Notice: Subject to any disclaimer, the term of this patent is extended or adjusted under 35 U.S.C. 154(b) by 298 days.

(21) Appl. No.: 13/549,332

(22) Filed: Jul. 13, 2012

(51) Int. Cl.
*G09B 3/00* (2006.01)
*G06Q 30/02* (2012.01)
*G09B 17/00* (2006.01)

(52) U.S. Cl.
CPC .......... *G06Q 30/0254* (2013.01); *G09B 17/003* (2013.01)

(58) Field of Classification Search
CPC .......... G09B 5/00; G09B 7/00; G09B 17/003; G06F 17/28; G06Q 30/0251
USPC ........ 434/156, 167, 169, 178, 323; 704/1, 10; 705/14.66
See application file for complete search history.

(56) References Cited

U.S. PATENT DOCUMENTS

| | | | |
|---|---|---|---|
| 6,366,759 B1 * | 4/2002 | Burstein et al. | 434/353 |
| 7,657,424 B2 | 2/2010 | Bennett | |
| 7,917,492 B2 | 3/2011 | Bargeron et al. | |
| 7,930,302 B2 | 4/2011 | Bandaru et al. | |
| 8,136,034 B2 | 3/2012 | Stanton et al. | |
| 8,573,980 B2 * | 11/2013 | Wetmore et al. | 434/236 |
| 2006/0121422 A1 * | 6/2006 | Kaufmann | 434/169 |
| 2010/0266999 A1 | 10/2010 | Follansbee et al. | |
| 2011/0087680 A1 | 4/2011 | Murdock et al. | |
| 2011/0252027 A1 * | 10/2011 | Chen et al. | 707/728 |
| 2013/0124298 A1 * | 5/2013 | Li et al. | 705/14.42 |

* cited by examiner

Primary Examiner — Peter Egloff

(57) ABSTRACT

A system, method, and computer program product are provided for personalizing content for a user based on a size of a working vocabulary of the user. In use, text is identified from content that is one of consumed and output by a user. Additionally, a size of a working vocabulary of the user is identified using the text. Further, the content is personalized based on the size of the working vocabulary of the user.

15 Claims, 6 Drawing Sheets

SYSTEM, METHOD, AND COMPUTER PROGRAM FOR PERSONALIZING CONTENT FOR A USER BASED ON A SIZE OF A WORKING VOCABULARY OF THE USER

FIELD OF THE INVENTION

The present invention relates to content personalization, and more particularly to personalizing content based on metrics.

BACKGROUND

Content personalization is an important part of online advertising, customer support, and other product recommendation fields. Typical content personalization relies on information collected about a user, and sometimes similar users, such as visited websites, purchases of products and services, and content subscriptions. Based on the collected information, content is personalized for the user, many times with the intention of selling a product or service related to the personalized content. Appropriate usage of such collected information, and other observed customer characteristics, has been shown to improve recommendation success rates through the increased relevance of content shown to users.

However, conventional techniques for personalizing content have exhibited various limitations. Just by way of example, they have typically not taken into account all of the meaningful user characteristics based on which content is capable of being personalized, such as a vocabulary of a user. There is thus a need for addressing these and/or other issues associated with the prior art.

SUMMARY

A system, method, and computer program product are provided for personalizing content for a user based on a size of a working vocabulary of the user. In use, text is identified from content that is one of consumed and output by a user. Additionally, a size of a working vocabulary of the user is identified using the text. Further, the content is personalized based on the size of the working vocabulary of the user.

DETAILED DESCRIPTION

Figure 1:
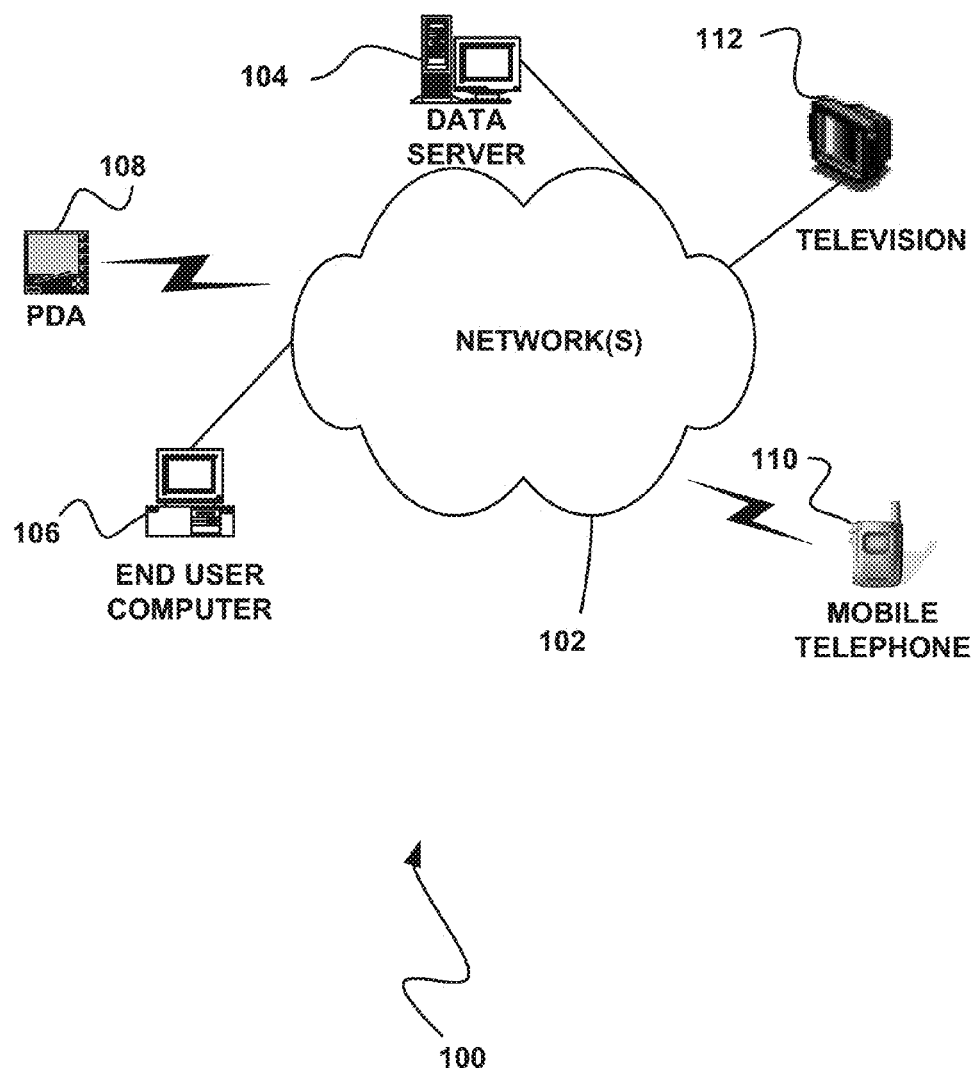
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
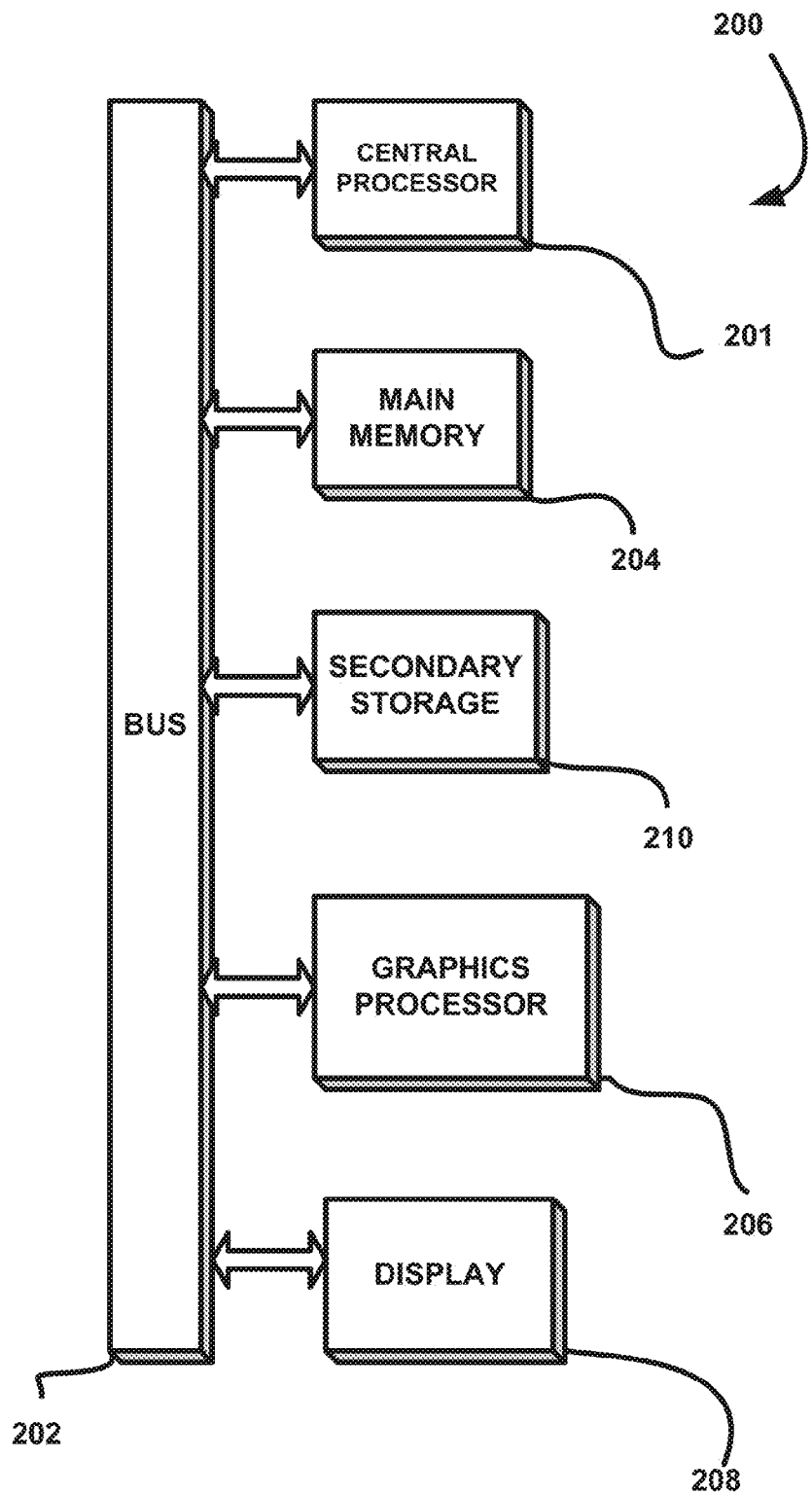
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
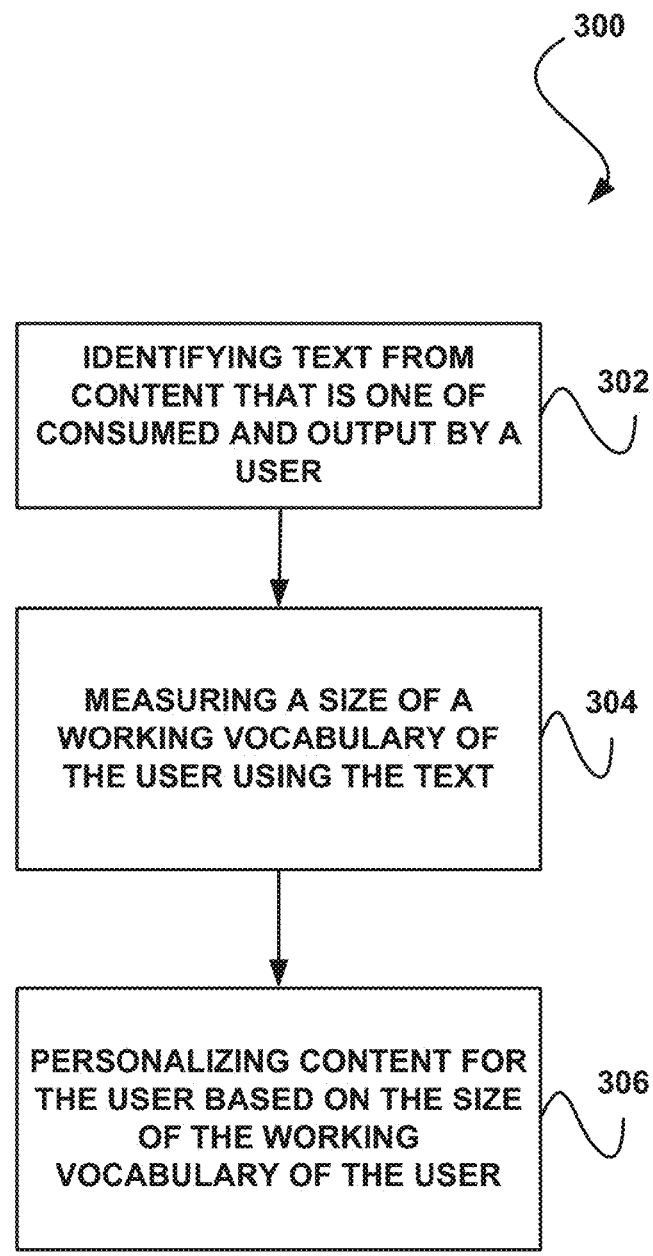
FIG. 3 illustrates a method for personalizing content for a user based on a size of a working vocabulary of the user, in accordance with one embodiment.

FIG. 3 illustrates a method 300 for personalizing content for a user based on a size of a working vocabulary of the user, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, text is identified from content that is one of consumed and output by a user. In the context of the present description, a user refers to any user of any network or hardware device, including, but not limited to, any of the plurality of devices in FIG. 1, that is capable of being used by the user for consuming and/or outputting content. For example, the user may be a user of the end user computer 106, the PDA 108, the data server 104, the television 112, the mobile phone 110, or any other device capable of network access.

Further, the user may have an account with a network community or network service, such as a social network, a blog, an email provider, or an online forum for consuming/outputting the content. The network may include the Internet. Still further, the user account may be associated with a profile containing information pertaining to the user.

In one embodiment, the user may have an account with a network community, such as a community of Internet shoppers. In another embodiment, the user may have a blogging account on a blogging platform such as Blogger®. In another embodiment, the user may have an account with an Internet service, such as Google®, Yahoo!®, Yelp®, Twitter@, or the Apple iTunes® store. In yet another embodiment, the user may have an account with a social network, such as Facebook®, MySpace®, Google+®, or Orkut®. Still further, the user may have an account with, and/or be a user of, any combination of the network communities, Internet services, and/or social networks.

Further, the content may be any data, signals, etc. capable of being consumed/output by the user. For example, where the content is output by the user, the content may be speech of the user, a writing of the user, etc. As another example, where the content is consumed by the user, the content may be audio heard by the user, video having audio that is viewed by the user, data read by the user, etc. In any case, the text identified from the content that is consumed/output by the user may be any text associated with the content that is consumed/output by the user, such as text that is representative of, descriptive of, transcribed from, included in, etc. the content. In various exemplary embodiments, the text may be text generated from a transcription of speech of the user or audio heard by the user, text written by the user, text read by the user, etc.

For example, text written by the user refers to any text that the user may write which is capable of being identified. In addition, text read by the user refers to any text that the user may read which is capable of being identified. For example, content output by the user may be transmitted to various networks, and/or network servers of the aforementioned network communities. Moreover, content consumed by the user may be transmitted to a device of the user (e.g. in a response to a request from the user for the text). For example, in one embodiment, the content consumed/output by the user may include a review of a product, service, venue, or establishment. In another embodiment, the content consumed/output by the user may include a personal communication, such as an email, instant message, notes added to an ebook while reading the ebook, or text message. In yet another embodiment, the content consumed/output by the user may include a blog post, such as fictional narrative, a non-fictional story, a news article, or a poem. Further, in another embodiment, the content consumed/output by the user may include a post to a social network, such as a status update, a caption to a photo or video, a tweet, a comment on other content residing on the social network, or a private message transmitted utilizing the social network. Still further, in yet another embodiment, the content consumed/output by the user may include a post to an online forum, such as a help or troubleshooting forum, a common interest forum, or a general discussion forum. To this end, the content consumed/output by the user may be any combination of the above examples, and may include multiple instances of content that the user has consumed/output.

As an option, the content that is consumed/output by the user may be in a native language of the user. Such native language may be indicated by a profile of the user, in one embodiment. Thus, where the user may be bilingual and consume/output different content in different languages, it is an option that text may only be identified for content that is consumed/output by the user in the native language of the user.

Thus, in one exemplary embodiment, the text may be identified from a written narrative of the user, which may be posted to a network server by the user such that the text is identified from the posting of the written narrative to the network server. Of course, it should be noted that the text associated with content consumed/output by the user may be identified in any manner that facilitates the identification of the text as being associated with content consumed/output by the user (e.g. an association of the content with the user). For example, the consumed/output content may be associated with a user name or user account of the user, posted on a web page specific to the user, etc. More particularly, the output content may be identified as originating with the user by way of a user name, user identification number, or email address of the user. In yet another embodiment, the output content may be signed by the user. In still yet another embodiment, the output content may be transmitted from a hardware device owned by, or otherwise associated with, the user. The consumed content may be identified as being received, viewed, etc. by the user. To this end, the identified text associated with content consumed/output by the user may be distinguished from other content that has been consumed/output by another user.

Additionally, as shown in operation 304, a size of a working vocabulary of the user is measured using the text. In the context of the present description, the working vocabulary of the user may refer to words within a language which are determined to be familiar to the user, and further the working vocabulary of the user may give a general estimate of a cognitive ability of the user. For example, the size of the working vocabulary of the user may be measured based on the number of words within the text associated with the content consumed/output by the user (e.g. such as when the text associated with the content consumed/output by the user contains more than a predetermined number of words, etc.).

In one embodiment, the size of the working vocabulary of the user may be measured by analyzing the text. Of course, it should be noted that a size of the working vocabulary of the user may be measured in any of a variety of ways that are based on the text. Thus, the size of the working vocabulary of the user may be any vocabulary metric describing the working vocabulary of the user.

In exemplary embodiment, the size of the working vocabulary of the user may be determined by using an estimation method. As an example, such estimation method may include a non-parametric model. Still further, the non-parametric model may count a number of different words included in the text, and may further count a total number of words included in the text. In some embodiments, the size of the working vocabulary of the user may be measured as a ratio of the number of different words included in the text to the total number of words included in the text, or may be measured as any other function of the number of different words included in the text and the total number of words included in the text.

In the context of the present description, the total number of words may be counted by iterating a counter +1 for each space encountered within the identified text. Similarly, the number of different words may be counted by iterating a counter +1 for each unique word encountered within the identified text after each space within the identified text. However, such counting methods are only exemplary, and the words in the identified text may be counted in any manner that counts the total number of words in the identified text and counts the number of different words in the identified text.

Additionally, as shown in operation 306, content for the user is personalized based on the size of the working vocabulary of the user. In the context of the present description, content refers to any information, data, etc. For example, in various embodiments, content may include, but is not limited to, articles, images, videos, and/or advertisements.

It should be noted that the content may be personalized for the user in any manner that is based on the size of the working vocabulary of the user. In one embodiment, personalizing content for the user may refer to increasing a relevance of the content with respect to the user. For example, in various embodiments, personalizing the content may include identifying, or otherwise inserting, customizing, suggesting, and/or providing, content for the user based on the size of the working vocabulary of the user. More specifically, in various embodiments, personalizing the content may include, but is not limited to, inserting an advertisement into a news article, editing the advertisement based on the information known about the user, selecting a news article from a plurality of news articles, and/or presenting the advertisement and news article to the user.

As noted above, the content is personalized for the user based on the size of the working vocabulary of the user. For example, the content (e.g. or a category, thereof) may be predetermined to correlate with a particular vocabulary size (e.g. or size range) matching the size of the working vocabulary of the user. Such particular vocabulary size may be predetermined to be suitable, appropriate, etc. to the content. More specifically, where the user is determined to have a working vocabulary of a first size, content predetermined to correlate with that first size may be provided to the user, whereas where the user is determined to have a working vocabulary of a second size (e.g. smaller, larger, etc. than the first size), content predetermined to correlate with that second size may be provided to the user. The predetermined correlations between content and working vocabulary sizes may be based on a previous determination that users having a particular working vocabulary size/range exhibit an interest in the content.

In this way, content may be targeted to the user based on the size of the working vocabulary of the user, as measured from text associated with content consumed/output by the user. Of course, it should be noted that in some embodiments the content may further be personalized for the user based on other attributes associated with the user, and is not necessarily limited to being personalized solely based on the size of the working vocabulary of the user.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
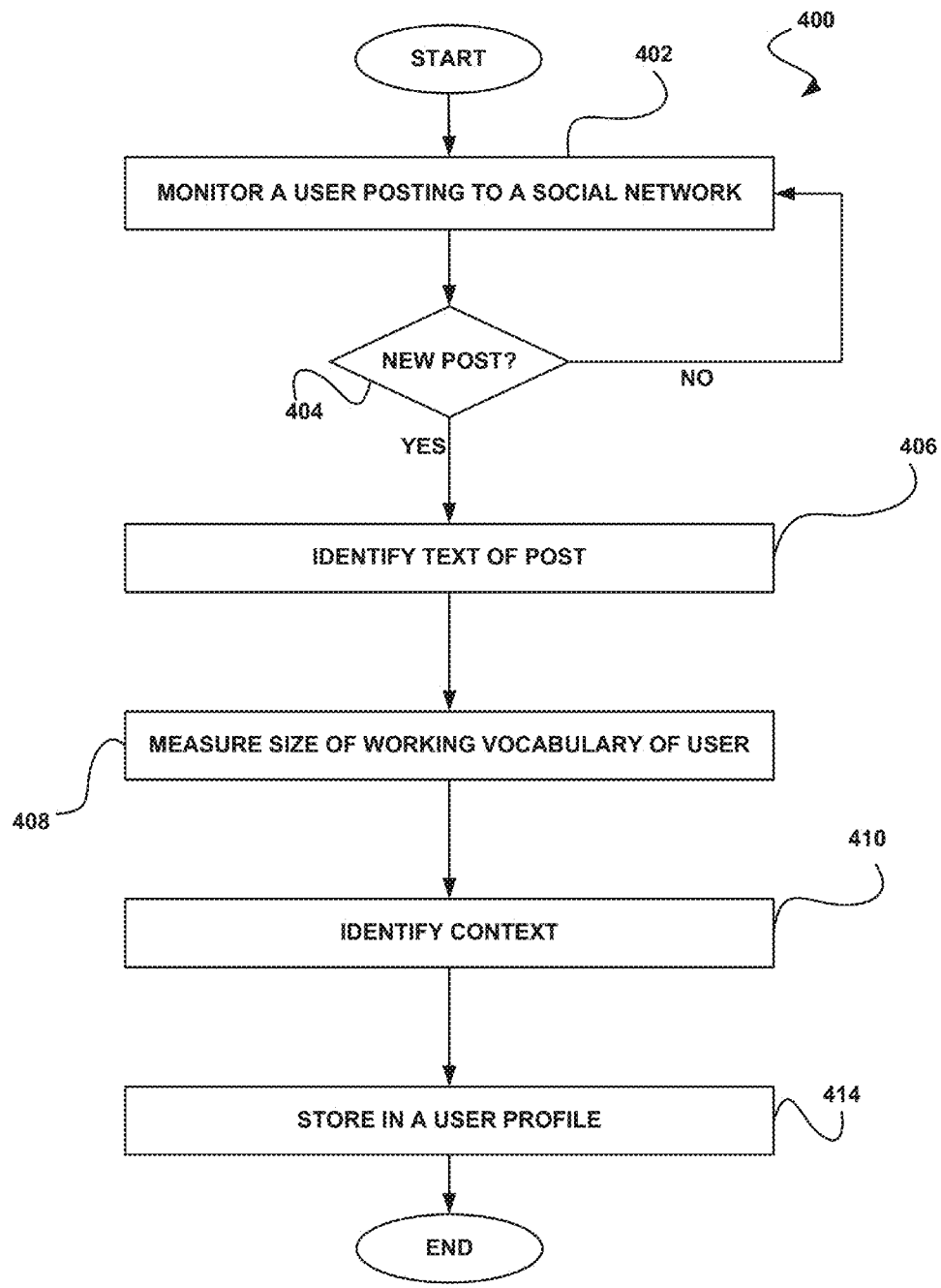
FIG. 4 illustrates a method for monitoring a user's posts to update a user profile to include a size of a working vocabulary of the user in accordance with another embodiment.

FIG. 4 illustrates a method 400 for monitoring a user's posts to update a user profile to include a size of a working vocabulary of the user in accordance with another embodiment. As an option, the method 400 may be carried out in the context of the details of FIGS. 1-3. Of course, however, the method 400 may be carried out in any desired environment. Further, the aforementioned definitions may equally apply to the description below. In addition, while the present method 400 is described in terms of text written by a user, it should be noted that the techniques described may be similarly employed with respect to identification of text associated with any content consumed or output by a user.

As shown in operation 402, a user is monitored for posts the user may make to a social network. Of course, in another embodiment, the user may be monitored for posts made to any network. For example, the user may be monitored for posts made by the user to an online forum, or the user may be monitored for posts made by the user to a blog. In the context of the present embodiment, monitoring the user may include receiving posts made by the user, tracking activity of the user on a network, or continuously polling a network for posts made by the user. To this end, monitoring the user for a posting may include any activity that recognizes when new content originating from the user has been posted to a network.

It is then determined in decision 404 whether the user has made a new post. Such new post may be any post with text that was not previously posted by the user or any other user (e.g. that is not a duplicate of a previous post by the user or another user, etc.) If the user has not made a new post, then the method 400 continues monitoring the user at operation 402. Further, if the user has made a new post, then the method 400 identifies text of the post in operation 406. The text of the post may be identified in accordance with operation 302 of the method 300 of FIG. 3, for example.

After the text of the post is identified, the method 400 proceeds to operation 408, where a working vocabulary size of the user is measured using the text of the post. The working vocabulary size of the user may be measured in accordance with operation 304 of FIG. 3, for example.

In operation 410 a context associated with the post is identified. In the context of the present embodiment, the context associated with the post is any ancillary information which may be associated with the post. For example, the context of the post may include an aspect associated with the post which may help for understanding or assessing the post.

In one embodiment, the context may include additional text surrounding the post. For example, the context associated with the post may be a political discussion on a social network, such as Facebook®. In another embodiment, the context may include a community to which the post was made. For example, the post may have been made to a community associated with scientists or truck enthusiasts. In another embodiment, the context may include real-world events that can be temporally correlated with the post. For example, the post may be identified as being contextually related to the recent conclusion of a professional soccer match.

The context associated with the post may be identified in any manner that facilitates the accurate association of the context with the post. In one embodiment, the context of the post may be identified by in accordance with preconfigured rules, such as a rule to identify the context as text surrounding the post (e.g. text posted immediately before the post and text posted immediately after the post, etc.)

Additionally, the measured size of the working vocabulary of the user and the identified context are stored in a user profile of the user, as shown in operation 414. In the context of the present description, storing the working vocabulary and the context of the post in the user profile includes any process for keeping such information for subsequent use. For example, the profile of the user may store various attributes associated with the user, such as demographic information, preferences of the user, etc.

In one embodiment, storing the working vocabulary and the context may occur as a part of a process for accumulating a plurality of vocabulary metrics of a plurality of users. For example, the method 400 may proceed for each of a plurality of users, and the method 400 may result in a working vocabulary size and context for each of the users.

In another embodiment, the working vocabulary size and the context may be stored to a storage device such as a memory or hard disk. For example, the working vocabulary size and/or the post context may be stored to the main memory 204 or the secondary storage 210, in accordance with the system 200 of FIG. 2. Such examples are not intended to be limiting, however, and the vocabulary size and the context may be stored to any suitable storage medium.

Figure 5:
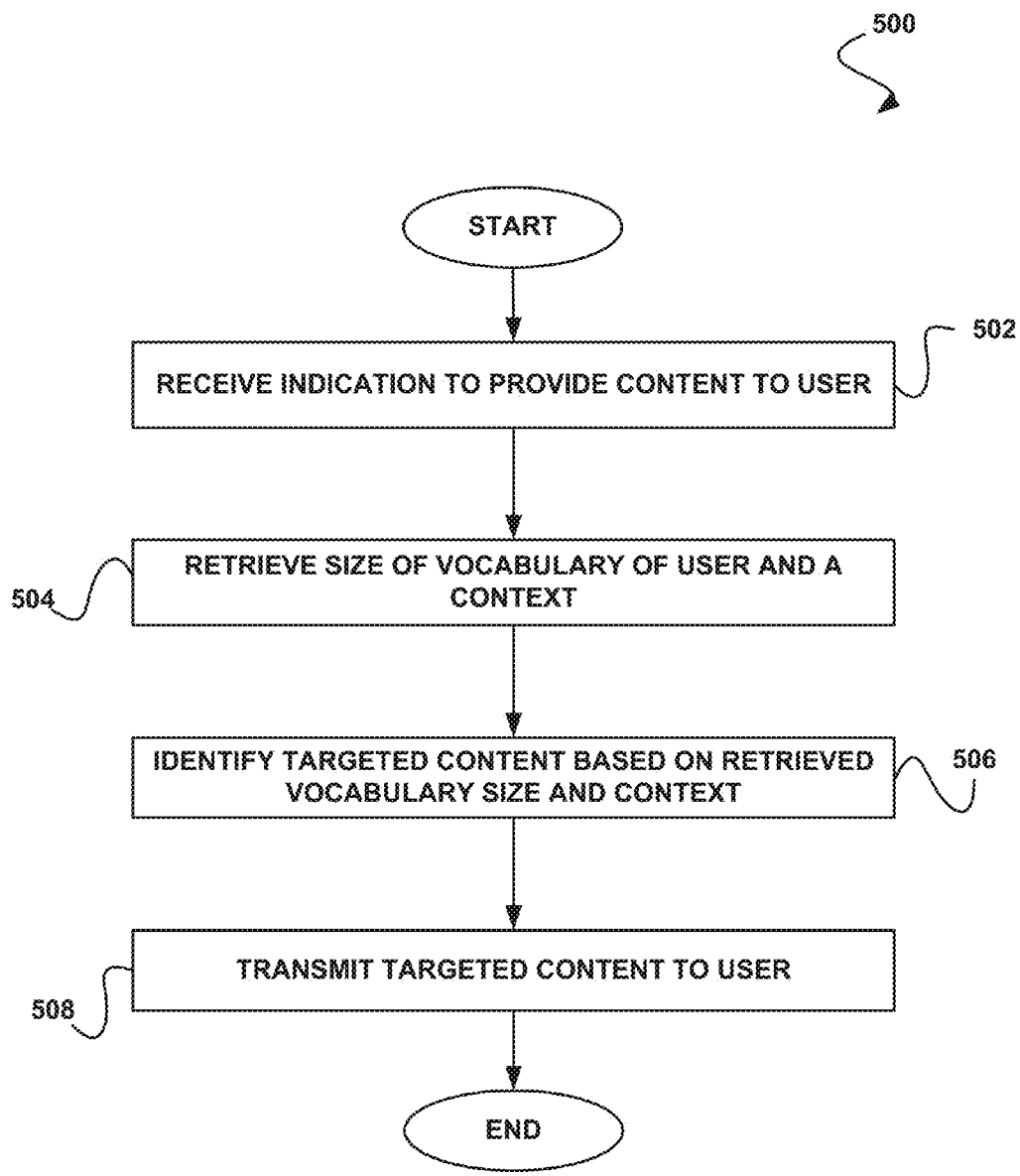
FIG. 5 illustrates a method for sending targeted content to a user based on the user's vocabulary size, in accordance with one embodiment.

FIG. 5 illustrates a method 500 for sending targeted content to a user based on the user's vocabulary size, in accordance with one embodiment. As an option, the method 500 may be carried out in the context of the details of FIGS. 1-4. Of course, however, the method 500 may be carried out in any desired environment. Further, the aforementioned definitions may equally apply to the description below.

As shown in operation 502, an indication to provide content to a user is received. The indication may be anything that serves to indicate that content is to be provided to the user. For example, the indication may be a request (e.g. from the user) to serve a web site, a request to serve an advertisement, or an incoming email associated with the user.

Additionally, as shown in operation 504, a vocabulary size of the user and a context thereof is retrieved. Thus, the vocabulary size of the user and the associated context may be retrieved in response to the indication to provide the content to the user. Further, the vocabulary size may be a vocabulary metric associated with the user, as discussed hereinabove with respect to FIGS. 1-4. Still further, the vocabulary size of the user may have been previously calculated for the user in the context of the details of FIGS. 1-4. By way of example, the vocabulary size of the user may have been previously calculated in the context of operation 304 of method 300, or operation 408 of method 400.

In another embodiment, the vocabulary size of the user and the associated context may be retrieved from the location at which the vocabulary size of the user has been previously stored. For example, the vocabulary size of the user and the associated context may have been previously stored in a profile for the user in accordance with operation 414 of method 400. In one embodiment, the vocabulary size of the user and the associated context may have been stored such that it is associated with the user or an account of the user. For example, the vocabulary size of the user and the associated context may have been stored in a profile of the user on a blogging platform, or associated with a profile of the user on a social network.

Additionally, as shown in operation 506, targeted content is identified based on the vocabulary size of the user and the associated context. The targeted content may include content personalized for the user, and may be identified based on the vocabulary size of the user in accordance with operation 306 of method 300. As noted hereinabove, the targeted content may be an advertisement, a recommendation, an article, or any other information selected or customized for the user based on the vocabulary size of the user and the associated context.

In addition, as shown in operation 508, the targeted content is transmitted to the user. In the context of the present embodiment, the transmission of the targeted content may be any process that results in the targeted content being sent from a first entity to the user. In one embodiment, transmitting the targeted content may include sending a customized email to the user. In another embodiment, transmitting the targeted content may include serving a selected advertisement to the user.

Providing targeted content to the user based on the vocabulary size associated with the user may allow content recommendation success rates to be increased as a result of increasing the relevance of content shown to the user. For example, click-through rates and conversion rates may be increased as a result of content targeting using vocabulary sizes. Further, because the user's vocabulary size may be related to the user's general cognitive ability, the user's vocabulary size may be applied to the personalization of many forms of content.

Figure 6:
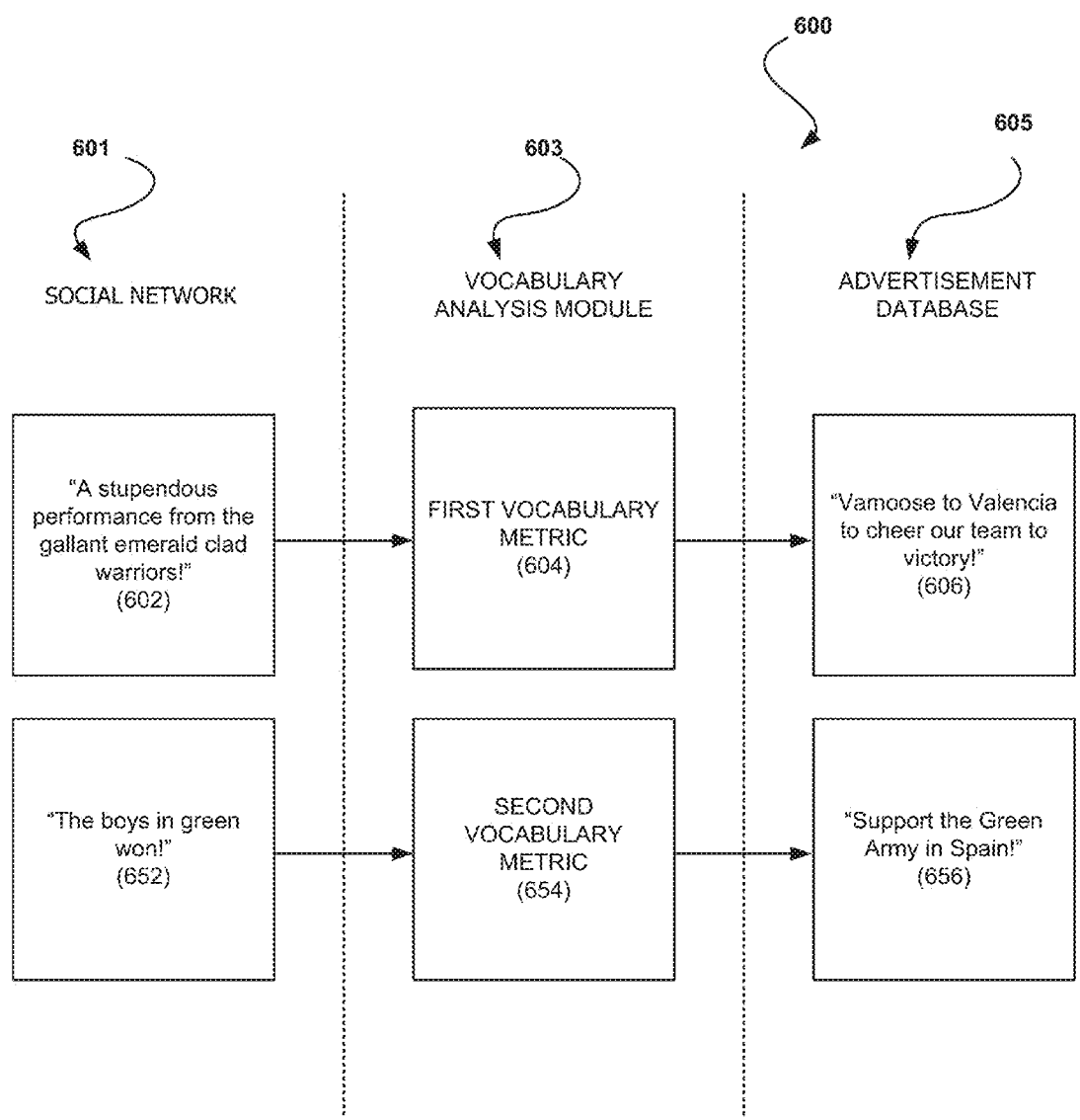
FIG. 6 illustrates a system targeting content to user based on a size of the user's vocabulary identified from a social network posting made by the user, in accordance with another embodiment.

FIG. 6 illustrates a system 600 targeting content to user based on a size of the user's vocabulary identified from a social network posting made by the user, in accordance with one embodiment. As an option, the system 600 may be implemented in the context of the details of FIGS. 1-5. Of course, however, the system 600 may be implemented in any desired environment. Further, the aforementioned definitions may equally apply to the description below.

As shown in FIG. 6, the system 600 includes a social network 601, a vocabulary analysis module 603, and an advertisement database 605. In the context of the present embodiment, the social network 601 may be one or more of Facebook®, MySpace®, Google+®, Orkut®, etc. Further, the vocabulary analysis module 603 may be any module capable of analyzing text written by a user in accordance with the details of FIGS. 1-5. By way of specific example, the vocabulary analysis module 603 may be capable of performing the operation 304 of method 300. In one embodiment, the vocabulary analysis module 603 and/or the advertisement database 605 may be components of the social network 601. In another embodiment, the vocabulary analysis module 603 and/or the advertisement database 605 may be components of one or more third parties to the social network 601.

Additionally, the advertisement database 605 may be any data structure storing advertisements. For example, the advertisement database 605 may be a repository of advertisements for a single advertiser, or the advertisement database 605 may be a repository of advertisement for multiple advertisers. Further, the advertisement database 605 may store advertisements in one or more formats, such as text advertisements, image advertisements, audio advertisements, and video advertisements. The advertisement module 605 may be responsible for transmitting a targeted advertisement to a user in accordance with operation 508 of method 500, as an example. Of course, while advertisements are described herein, it should be noted that the advertisement database 605 may be a data structure storing any type of content capable of being personalized for a user.

In one embodiment, the social network 601 receives a first user text written by first user (operation 602). Additionally, the social network 601 receives a second user text written by second user (operation 652). In one embodiment, the first user text and the second user text may be received in accordance with the operations 402-406 of method 400, for example. In another embodiment, the first user text and the second user text may be identified in accordance with operation 302 of method 300, for example.

As shown in FIG. 6, the first user text is identified to include the text of "A stupendous performance from the gallant emerald clad warriors!" As also shown in FIG. 6, the second user text is identified to include the text of "The boys in green won!" Both of the first user text and the second user text may be posted in response to the same real-world event. Further, both the first user text and the second user text may be posted to the same social network 601, as shown in FIG. 6. In another embodiment, the first user text and the second user text may be posted to different networks. For example, the first user text may be posted to a blog, while the second user text is posted to a help forum.

Additionally, both the first user text and the second user text may be posted to the social network 601 in response to a green-uniformed sports team winning an important match. In accordance with an embodiment, the first user text and/or the second user text may be identified within written narratives authored by the respective users. For example, the first user text may be an excerpt of a larger narrative written by the first user. Further, the second user text may be the entirety of a status update written by the second user.

Based on the first user text, a size of a first working vocabulary is measured by the vocabulary analysis module 603 (operation 604). Similarly, based on the second user text, a size of a second working vocabulary is measured by the vocabulary analysis module 603 (operation 654).

In one embodiment, the size of the first working vocabulary and the size of the second working vocabulary may be measured in accordance with operation 408 of method 400. More specifically, measuring the size of the first working vocabulary may include counting a total number of words, and a number of different words, in the text of "A stupendous performance from the gallant emerald clad warriors!" Further, measuring the size of the second working vocabulary may include counting a total number of words, and a number of different words, in the text of "The boys in green won!"

In one embodiment, the size of the first working vocabulary may similar to the size of the second working vocabulary as a result of there being a same ratio of number of different words to total number of words in both the first user text and the second user text. Thus, the measurement may take into account additional text written by the first user and the second user. Such additional text may be text surrounding, preceding, following, etc. the first user text and second user text, such that the measurement may be based on a size of all of the text written by the user.

Additionally, as shown in the system 600, the advertisement database 605 provides a first advertisement to the first user based on the size of the first working vocabulary of the first user (operation 606). Further, the advertisement database 605 provides a second advertisement to the second user based on the size of the second working vocabulary of the second user (operation 656). More specifically, the first advertisement is shown to include the text "Vamoose to Valencia to cheer our team to victory!" Further, the second advertisement is shown to include the text "Support the Green Army in Spain!"

In accordance with an embodiment, the first user may have been identified to have a working vocabulary of a size that matches a first predetermined working vocabulary threshold (e.g. or is within a first predetermined working vocabulary range, or is of a first predetermined distance from a particular working vocabulary size). Further, the second user may have been identified to have a working vocabulary of a size that matches a second predetermined working vocabulary threshold (e.g. or is within a second predetermined working vocabulary range, or is of a second predetermined distance from a particular working vocabulary size). Optionally, the first predetermined working vocabulary threshold/range may be associated with a larger (e.g. more comprehensive, etc.) working vocabulary than the second predetermined working vocabulary threshold/range.

The first advertisement may have been selected for presentation to the first user based on a determination that the first advertisement is associated with (e.g. assigned to) the first predetermined working vocabulary threshold matching the working vocabulary size of the first user. Similarly, the second advertisement may have been selected for presentation to the second user based on a determination that the second advertisement is associated with (e.g. assigned to) the second predetermined working vocabulary threshold matching the working vocabulary size of the second user. For example, the advertisement database 605 may store the advertisements in association with an indication of a particular predetermined working vocabulary threshold/range, where such threshold/range relates to one or more particular sizes.

The association between the predetermined working vocabulary thresholds/ranges and the advertisements may be determined based on historical activity associated with the advertisements, or other content associated therewith. For example, the first advertisement may be associated to the first predetermined working vocabulary threshold in response to a determination that historically the first advertisement has preferentially been clicked on by users having a working vocabulary size matching the first predetermined working vocabulary threshold/range. As another example, the first advertisement may have been previously selected by a threshold number of other users each having a working vocabulary size matching the first predetermined working vocabulary threshold/range. Similarly, the second advertisement may be associated to the second predetermined working vocabulary threshold in response to a determination that historically the second advertisement has preferentially been clicked on by users having a working vocabulary size matching the second predetermined working vocabulary threshold/range. For example, the second advertisement may have been previously selected by a threshold number of other users each having a working vocabulary size matching the second predetermined working vocabulary threshold/range.

In another embodiment, contextual information for both the first user text and the second user text may be identified, in accordance with operation 410 of method 400. Further, the contextual information identified for the first user text may be augmented with the size of the first working vocabulary and the contextual information identified for the second user text may be augmented with the size of the second working vocabulary.

In yet another embodiment, the advertisements may be selected for the respective users based on characteristics assigned to the advertisements that are predetermined to be associated with the respective working vocabulary sizes of the users. For example, the first working vocabulary size of the first user may be correlated with a first set of user characteristics matching user characteristics assigned to the first advertisement, while the second working vocabulary size of the second user may be correlated with a second set of user characteristics matching user characteristics assigned to the second advertisement. These correlations may be based on a determination that there is an association between a size of a user's vocabulary and other characteristics of the user.

Just by way of example, the first working vocabulary size of the first user and the second working vocabulary size of the second user may each be correlated with a different intelligence quotient (IQ) of the first user and the second user, respectively. Further, the IQ of the first user and the IQ of the second user may be correlated with one or more characteristics such as health, height, income, academic performance, academic achievement, marital status, parenthood, criminality, religiosity, myopia, or any other characteristic. In another embodiment, the advertisements may be selected for the respective users based on a predetermined association of the advertisement with an IQ matching the user's IQ and/or a predetermined association of the advertisement with user characteristics derived from the user's IQ.

To this end, users may be linked to common advertisements based on the user's having similar levels of semantic complexity, namely similar working vocabulary sizes (such that "smart" users are linked with "smart" content), and/or on assuming preferences for a user based on preferences of other people having a similar working vocabulary size as the user ("smart" users like what other "smart" users like). Thus, the advertisements may optionally be personalized for a user using preferences identified for other users having a working vocabulary size within a same predetermined range as the size of the working vocabulary of the user.

In the context of the present embodiment, the first working vocabulary size may be correlated with a greater academic achievement than an academic achievement correlated to the second working vocabulary size. As a consequence of such difference in academic achievement, the second advertisement selected for display to the second user may (e.g. intentionally) be simpler or priced differently than the first advertisement selected for display to the first user. In one embodiment, simplification may result in the use of smaller, easier to understand words in the advertisement. In another embodiment, simplification may result in the advertisement having a shortened length. In yet another embodiment, simplification may result in a substitution or insertion of a better-known phrase in place of a lesser-used phrase. For example, in the context of the system 600, it may have been previously determined that a user associated with a working vocabulary size below a predetermined threshold is unlikely to understand that Valencia is a city in Spain, or is unlikely to know and respond to the meaning of the word "vamoose," such that these terms may be excluded from an advertisement provided to the user.

In the context of the present embodiment, both the first advertisement and the second advertisement may be advertisements intended to entice the first user and the second user, respectively, to purchase travel for a holiday. In one embodiment, both the first advertisement and the second advertisement may be advertisements which, when selected by the first user and second user, respectively, allow the purchase of travel for following the green-uniformed sports team to their next match in Valencia, Spain. The first advertisement and the second advertisement may be presented on the same social network to which the first user text and the second user text were posted. In another embodiment, the first advertisement and the second advertisement may be presented to the first user and the second user, respectively, by way of any other network service.

In one embodiment, the travel package offered to the first user by way of the first advertisement may be the same as the travel package offered to the second user by way of the second advertisement. In another embodiment, the travel package offered to the first user by way of the first advertisement may be different than the travel package offered to the second user by way of the second advertisement. For example, products and/or services offered through the first advertisement and the second advertisement may be customized based on the first working vocabulary size of the first user and the second working vocabulary size of the second user, respectively.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program embodied on a non-transitory computer readable medium, comprising computer code for:
    identifying by a social network text from content that is one of consumed and output by a user;
    determining by the social network a native language of the user indicated within a profile of the user within the social network;
    identifying by a vocabulary analysis module a total number of words within the identified text;
    measuring a size of a working vocabulary of the user by the vocabulary analysis module using the text upon determining that the identified text is in the determined native language of the user and upon determining that the total number of words within the identified text is greater than a predetermined number, where measuring the size of the working vocabulary includes:
        identifying a total number of distinct words within the identified text, and
        calculating the size of the working vocabulary as a ratio of the total number of distinct words to the total number of words within the identified text;
    storing by an advertisement database a plurality of advertisements, where for each of the plurality of advertisements, the advertisement is stored by the advertisement database in association with one of a plurality of vocabulary thresholds upon determining by the advertisement database that the advertisement has been previously selected by a threshold number of other users each having the working vocabulary matching the vocabulary threshold; and
    selecting by the advertisement database one of the plurality of advertisements for presentation to the user, where the advertisement is selected based on a determination that the advertisement is stored in association with a vocabulary threshold matching the size of the working vocabulary of the user.

2. The computer program of claim 1, wherein the text is included in content written by the user.

3. The computer program of claim 1, wherein the text is included in content read by the user.

4. The computer program of claim 1, wherein the advertisement is selected further based on a context of the text.

5. The computer program of claim 1, wherein the content includes at least one of a recommendation and an advertisement.

6. The computer program of claim 1, wherein the selected advertisement is previously determined to be clicked on by a threshold number of other users each having a working vocabulary size matching the vocabulary threshold.

7. The computer program of 1, further comprising correlating the size of the working vocabulary of the user to an intelligence quotient, wherein content is personalized for the user by identifying for the user content associated with the intelligence quotient.

8. The computer program of claim 1, further including storing the size of the working vocabulary of the user in the profile of the user.

9. The computer program of claim 8, wherein the content is personalized by identifying the size of the working vocabulary of the user from the profile of the user.

10. The computer program of claim 1, wherein the size of the working vocabulary of the user is predetermined to be associated with at least one characteristic.

11. The computer program of claim 10, wherein content is personalized for the user based on the at least one characteristic.

12. The computer program of claim 1, wherein content is personalized for the user using preferences identified for other users having a working vocabulary size within a same predetermined range as the size of the working vocabulary of the user.

13. A method, comprising:
    identifying by a social network text from content that is one of consumed and output by a user;
    determining by the social network a native language of the user indicated within a profile of the user within the social network;
    identifying by a vocabulary analysis module a total number of words within the identified text;
    measuring a size of a working vocabulary of the user by the vocabulary analysis module using the text upon determining that the identified text is in the determined native language of the user and upon determining that the total number of words within the identified text is greater than a predetermined number, where measuring the size of the working vocabulary includes:
　identifying a total number of distinct words within the identified text, and
　calculating the size of the working vocabulary as a ratio of the total number of distinct words to the total number of words within the identified text;
storing by an advertisement database a plurality of advertisements, where for each of the plurality of advertisements, the advertisement is stored by the advertisement database in association with one of a plurality of vocabulary thresholds upon determining by the advertisement database that the advertisement has been previously selected by a threshold number of other users each having the working vocabulary matching the vocabulary threshold; and
selecting by the advertisement database one of the plurality of advertisements for presentation to the user, where the advertisement is selected based on a determination that the advertisement is stored in association with a vocabulary threshold matching the size of the working vocabulary of the user.

14. A system, comprising:
a processor for:
identifying by a social network text from content that is one of consumed and output by a user;
determining by the social network a native language of the user indicated within a profile of the user within the social network;
identifying by a vocabulary analysis module a total number of words within the identified text;
measuring a size of a working vocabulary of the user by the vocabulary analysis module using the text upon determining that the identified text is in the determined native language of the user and upon determining that the total number of words within the identified text is greater than a predetermined number, where measuring the size of the working vocabulary includes:
　identifying a total number of distinct words within the identified text, and
　calculating the size of the working vocabulary as a ratio of the total number of distinct words to the total number of words within the identified text;
storing by an advertisement database a plurality of advertisements, where for each of the plurality of advertisements, the advertisement is stored by the advertisement database in association with one of a plurality of vocabulary thresholds upon determining by the advertisement database that the advertisement has been previously selected by a threshold number of other users each having the working vocabulary matching the vocabulary threshold; and
selecting by the advertisement database one of the plurality of advertisements for presentation to the user, where the advertisement is selected based on a determination that the advertisement is stored in association with a vocabulary threshold matching the size of the working vocabulary of the user.

15. The system of claim 14, wherein the processor is coupled to memory via a bus.

* * * * *